United States Patent
Downs

(10) Patent No.: US 6,319,442 B1
(45) Date of Patent: Nov. 20, 2001

(54) PROCESS OF MAKING A THERMOPLASTIC ADHESIVE DISPENSING TAPE

(75) Inventor: John P. Downs, Lannon, WI (US)

(73) Assignee: Glue Dots International, LLC, New Berlin, WI (US)

( * ) Notice: Subject to any disclaimer, the term of this patent is extended or adjusted under 35 U.S.C. 154(b) by 0 days.

(21) Appl. No.: 09/363,200

(22) Filed: Jul. 29, 1999

Related U.S. Application Data

(63) Continuation of application No. 08/909,189, filed on Aug. 11, 1997, now Pat. No. 5,935,670.
(60) Provisional application No. 60/036,896, filed on Feb. 6, 1997.

(51) Int. Cl.$^7$ .................................. B05D 5/10; B32B 1/00
(52) U.S. Cl. .......................... 264/132; 264/145; 264/146; 264/148; 264/171.13; 427/208.4; 427/208.6
(58) Field of Search ..................................... 264/132, 145, 264/146, 148, 171.13; 427/208.4, 208.6

(56) References Cited

U.S. PATENT DOCUMENTS

| | | | |
|---|---|---|---|
| 3,741,786 | 6/1973 | Torrey | 428/41.9 |
| 5,344,681 | 9/1994 | Calhoun et al. | 428/42.3 |
| 5,489,453 | 2/1996 | Friesch | 428/34.1 |
| 5,935,670 | 8/1999 | Downs | 428/40.1 |

*Primary Examiner*—Leo B. Tentoni
(74) *Attorney, Agent, or Firm*—Reinhart, Boerner, Van Deuren, Norris & Rieselbach, s.c.

(57) ABSTRACT

Hot melt thermoplastic adhesive is predeposited on a carrier strip having front and back release surfaces. The carrier strip is rolled into a coil compressing the thermoplastic hot melt into disks which may later be removed for use. The disks are spaced so that the carrier strip may be deformed to expose a single disk to a planar surface permitting simplified dispensing of the disks.

12 Claims, 4 Drawing Sheets

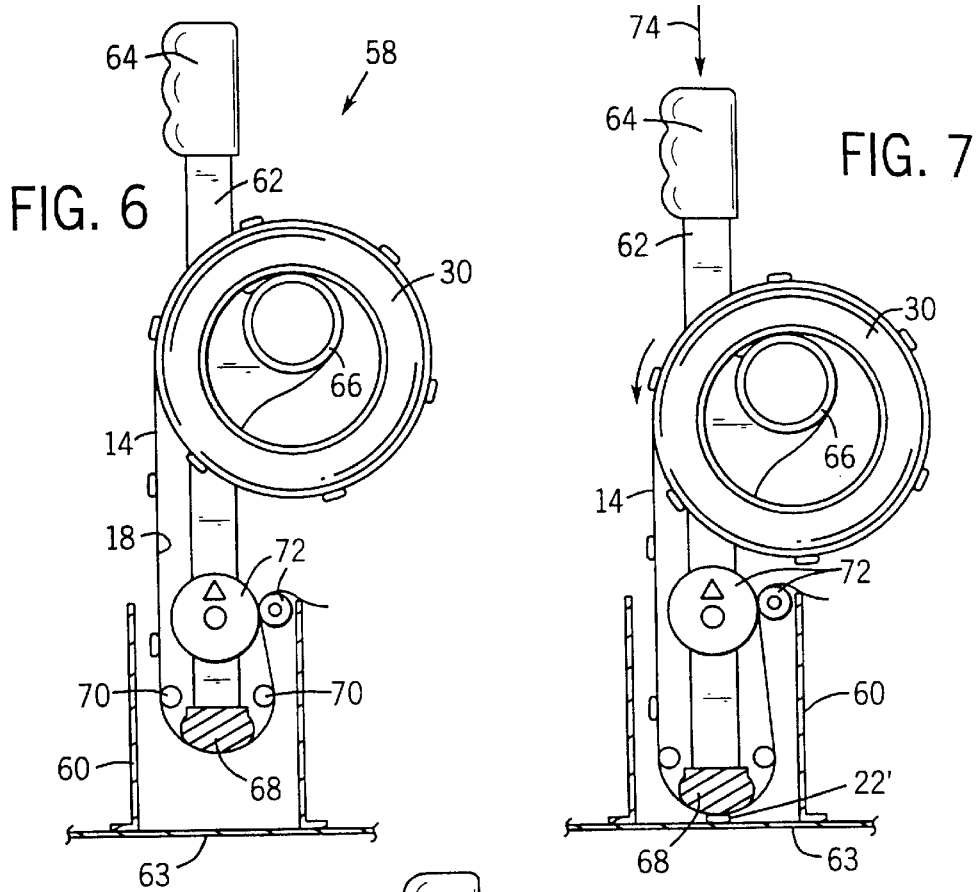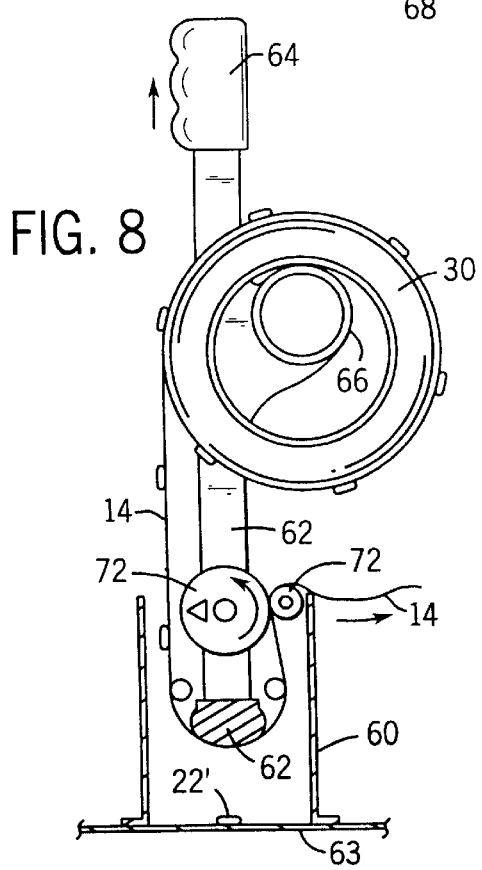

PROCESS OF MAKING A THERMOPLASTIC ADHESIVE DISPENSING TAPE

CROSS-REFERENCE TO RELATED APPLICATIONS

This application is a continuation in part of application Ser. No. 08/909,189 filed Aug. 11, 1997 now issued as U.S. Pat. No. 5,935,670 which in turn claims the benefit of provisional application No. 60/036,896 filed Feb. 6, 1997, all hereby incorporated by reference.

STATEMENT REGARDING FEDERALLY SPONSORED RESEARCH OR DEVELOPMENT

BACKGROUND OF THE INVENTION

In the preparation of mass mailings, for example, it is often desired to attach a card, such as a credit card or the like, to a carrier document so that the former can be peeled easily from the carrier document for use by a consumer. One method of making such an attachment uses a pressure-sensitive, thermoplastic adhesive. During the printing or collating process, a portion of the thermoplastic adhesive is metered onto the carrier document and the card pressed against this material. The equipment for this process includes a heating container for the thermoplastic adhesive and a metering pump that may be electrically actuated.

Thermoplastic adhesive can be difficult to work with. Its high melting temperature and adhesive properties present some risk of burn to untrained operators. The price of the equipment for dispensing the thermoplastic adhesive and positioning and placing the attachments makes such equipment impractical for low volume mailings. Further it is inefficient to activate such equipment for short runs both in energy costs and wasted glue.

BRIEF SUMMARY OF THE INVENTION

The present invention provides a method and apparatus allowing thermoplastic pressure-sensitive adhesives to be used simply and safely by those who have low-volume requirements. In the present invention, pressure-sensitive thermoplastic adhesive is pre-metered onto a release strip which may be rolled into coil. The size and spacing of the metered dots of thermoplastic adhesive allows one dot to be exposed at a time across an anvil plate which may be used to press the dot against a card or the like. The carrier strip may be advanced between the pressing operation to bring a new dot into position.

The spacing of the dots along the strip provides simple methods of dispensing the dots including the use of a specially constructed cardboard dispenser box or the like or various automated metering systems and mechanisms to be described.

Specifically the present invention provides a thermoplastic adhesive dispensing tape having a flexible carrier tape extending longitudinally and having a transverse width and having opposed first and second release surfaces. Thermoplastic adhesive dots are arrayed longitudinally along the first release surface so that the carrier tape may be curved about an axis to expose a single adhesive dot to an abutting planar surface.

Thus, it is one object of the invention to provide a simple means for dispensing thermal plastic adhesive dots without requiring the expense or hazard of molten thermoplastic adhesive.

The second release surface may adhere less strongly to the thermoplastic adhesive dot than does the first release surface.

Thus, it is another object of the invention to provide a thermoplastic adhesive dispensing tape that may be unwound from a coil with the thermoplastic adhesive dots being retained on the first release surface.

The invention includes a method of manufacturing the thermoplastic adhesive dispensing tape by unrolling the flexible carrier strip from a first reel to expose the first release surface and dispensing molten thermoplastic adhesive at periodic intervals on the unrolled carrier strip. The carrier strip is then rerolled to compress the dispensed molten thermoplastic adhesive into flat disks.

Thus, it is another object of the invention to provide for adhesive disks that approximate the size and area that would be provided by an automatic dispensing equipment directly on the surfaces to be adhered together. The action of adjacent coils of the carrier strip mimics that of a card or other planar surface pressing against a molten portion of thermoplastics adhesives.

The rerolling of the flexible carrier strip may be delayed until the thermoplastic adhesive has skinned over.

Thus, it is yet another object of the invention to ensure that the thermoplastic adhesive dots are retained by the first release surface which receives the thermoplastic adhesive in a molten state prior to it skinning over and therefore adheres to it more strongly.

The step of dispensing molten thermoplastic adhesive may simultaneously dispense at least two separate portions of thermoplastic adhesive at transversely separated locations. The method may include the further step of longitudinally slitting the flexible carrier strip between separate portions of the thermoplastic adhesive prior to rerolling the flexible carrier strip.

Thus, it is another object of the invention to provide for a high throughput manufacture of adhesive dots with a single dispensing unit without jeopardizing the cooling of the dots as is necessary to allow them to skin over.

The invention also includes a dispensing apparatus for the thermoplastic adhesive dispensing tape including a reel support for holding the thermoplastic adhesive dispensing tape in coiled configuration, and a guide for receiving the carrier tape after adhesive dots have been removed. An anvil surface is positioned between the reel and the guide to receive the thermoplastic adhesive dispensing tape as unreeled from the coil and deform the thermoplastic adhesive dispensing tape to expose a single adhesive dot to a planar surface.

Thus, it is another object of the invention to provide a rapid application technique for the thermoplastic adhesive dots on the tape of the present invention. The positioning of the dots so that a single dot may be exposed to a planar surface allows the dots to be readily applied to planar surfaces by a proper incrementing of the tape over a correctly sized anvil surface.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

BRIEF SUMMARY OF THE DRAWINGS

FIG. 6 is a simplified fragmentary cross section of a semi-automatic dispensing machine positioned for dispensing an adhesive dot on a carrier sheet prior to dispensing;

FIG. 7 is a view similar to that of FIG. 6 showing a downward activation of the apparatus of FIG. 6 advancing a dot from the carrier strip over a movable anvil surface to be pressed against the carrier sheet;

FIG. 8 is a figure similar to that of FIGS. 6 and 7 showing the upward return of the apparatus after dispensing, the return causing a tensioning of the used carrier strip in preparation of a second stroke;

FIG. 12b is a plan view of FIG. 12a of a section of a strip having multiple adjacent dots produced by the nozzle of FIG. 12a;

DESCRIPTION OF THE PREFERRED EMBODIMENT

Figure 1:
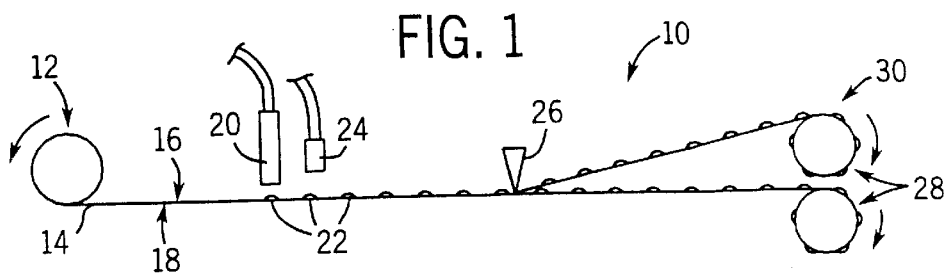
FIG. 1 is a schematic view of a manufacturing system for the present invention showing the dispensing of thermoplastic pressure-sensitive dots onto a carrier strip and the winding of the strip into coils.

Referring to FIG. 1, an adhesive dot manufacturing machine 10 provides a back tensioned reel 12 holding a differential release carrier strip 14. The carrier strip 14 is a paper that has a silicon release material on opposed first and second surfaces 16 and 18 selectively applied so that surface 16 provides less release than surface 18.

The carrier strip 14 is dispensed from the tensioned reel 12 with surface 16 facing upward to move beneath a pair of thermoplastic glue metering nozzles 20 (only one of which is visible in FIG. 1) supplied with thermoplastic adhesive by a metering pump (not shown) to dispense side-by side glue dots 22 onto surface 16 as surface 16 moves past nozzle 20. Air jet 24 directed on surface 16 then cools the glue dots 22, which are also cooled by natural convection as the carrier strip 14 moves along.

A slitting knife 26 divides the carrier strip 14 into multiple strips, each of which are then wound into coils 30 on take-up reels 28 under controlled tensioning. Capstan and idler wheels may also be provided so that the tension on reels 28 may be controlled independently of the tension provided by reel 12.

Figure 3:
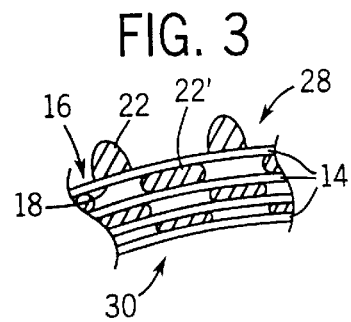
FIG. 3 is a cross section through a coil of FIG. 1 showing the compression of the dots by adjacent coils of the release strip.

Referring now to FIG. 3, the glue dots 22 are initially mounded high on the surface 16 of the carrier strip 14, but as they are wound about the reel 28, each glue dot 22' is compressed beneath surface 18 of the carrier strip 14 of the next succeeding layer of carrier strip 14 and the surface 18 of the layer of the carrier strip 14 on which it was deposited so as to flatten the glue dots 22' into circular disks. Alternatively, a cooled drum having a non-stick surface may be used to flatten the glue dots 22 prior to winding on reel 28.

The differential release properties of surfaces 16 and 18, the fact that the glue dots 22 were initially applied in a hot state to surface 16 causing better adherence, and the fact that there is some cooling and hence "skinning over" of the glue dots 22 prior to the winding on reel 28, all ensure that the glue dots 22 remain adhered to surfaces 16 as the coil 30 is unwound.

Figure 2:
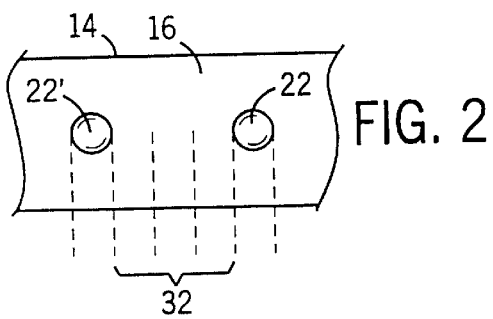
FIG. 2 is a plan view of a section of a strip of the present invention showing the ultimate spacing of the dots when flattened.

Referring now to FIG. 2, the spacing of the glue dots 22' after flattening on the carrier strip 14 is such that the glue dots 22' do not overlap in the dimension defined by the extent of carrier strip 14. This ensures that there is a margin 32 in that dimension such that an individual glue dot 22 may be exposed for adhering to a card or the like without the risk of the card picking up multiple glue dots 22. Dot 22 and 22' of a preferred embodiment may be separated by three times their diameter.

Figure 4:
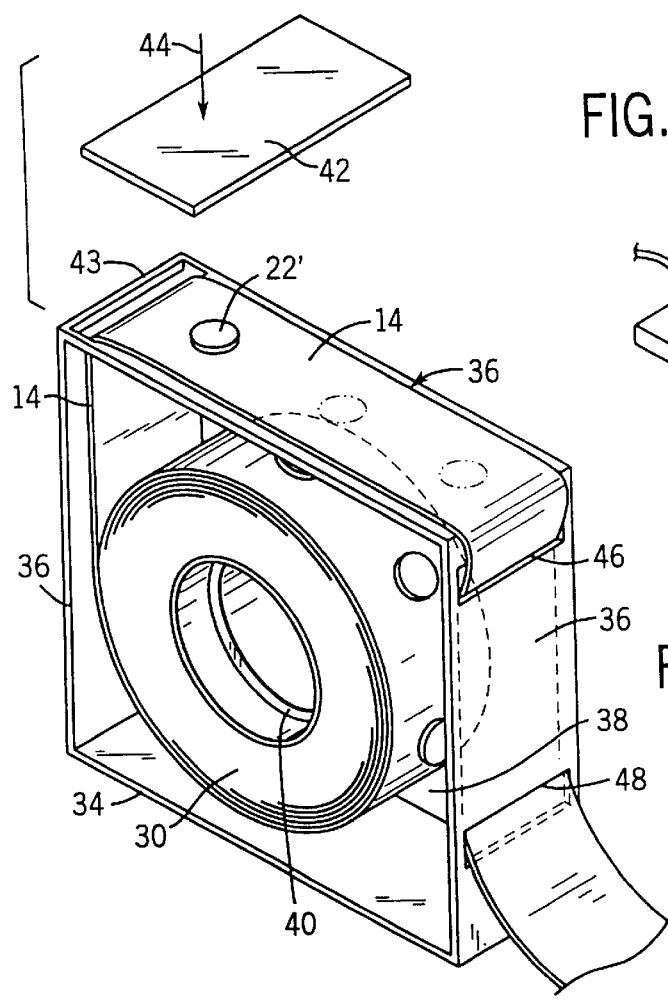
FIG. 4 is a perspective cut-away view of a container for dispensing the coils of FIG. 1 showing the spacing of the dots which permits a single dot to be exposed over an anvil surface for attachment to a card.

Referring now FIG. 4, the coil 30 may be inserted within a dispensing container 34 having generally rectangular configuration with top, side, and bottom walls 36 and a spanning vertical wall 38. Vertical wall 38 includes a coil support hub 40 extending laterally into the volume of the container 34 from the vertical wall 38 about which the coil 30 may be positioned. As positioned, the coil 30 is free to rotate along a horizontal axis with the outer surfaces of the coil containing the glue dots 22' being removed from the inner surfaces of the walls 36.

A slot 43 at one end of the upper wall 36 allows a portion of the carrier strip 14 to be threaded from within the container 34 out of the slot 43 and across the upper wall 36 with the glue dots 22' exposed on the upper surface of the carrier strip 14. The upper wall 36 provides an anvil surface supporting the carrier strip 14 against pressure when a card 42 or the like is pressed down as indicated by arrow 44 against the upper surface of the carrier strip 14 to receive a glue dot 22'.

As a result of the earlier removal of the glue dots 22' on the carrier strip 14, only a single dot 22' will be exposed on the upper surface of the container 34 at a time simplifying this attachment process.

The portion of the carrier strip 14 previously having its dots 22' removed may be received within a slot 46 in a side wall 36 adjacent to the top wall 36 and then threaded out of a similar slot 48 positioned below slot 46 to permit sliding of the carrier strip 14 for the dispensing of additional dots 22 while preventing general looseness of the carrier strip 14 such as would promote unwinding of the coil 30 unintentionally.

Figure 5:
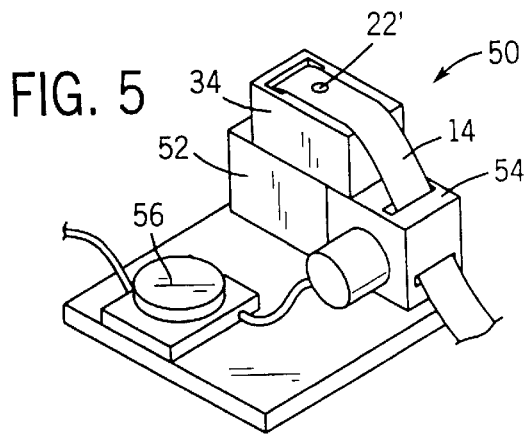
FIG. 5 is a perspective view of the container of FIG. 4 placed in an automatic tape advancing apparatus to pull the release strip a predetermined amount at the pressing of a palm button.

Referring to FIG. 5, the container 34 may be used for manual dispensing or may be placed within an automatic dispensing system 50. Such a system includes a rigid container sleeve 52, holding the lower portion of the container 34, and a motor drive unit 54 receiving the carrier strip 14 after dots have been removed and incrementing the tape by a predetermined amount with a pressing of a palm-sized push button 56. With each pressing of the button 56, the motor drive unit 54 increments the carrier strip 14 by the interdot spacing so as to expose a single dot 22' at the top of the container 34.

Referring now to FIG. 6 in an alternative dispensing method, the coil 30 may be carried on a semi-automatic affixing tool 58. A foot portion 60 of the tool 58 is placed at the top of a carrier sheet 63 where an adhesive dot will be placed. A plunger assembly 62 attached to slide up and down with respect to the foot portion 60 and biased upward with helical tension springs (not shown) so as to normally be held away from the carrier sheet 63 prior to the dispensing action. Plunger assembly 62 has a handle 64 exposed above the coil 30 and connected to a hanger 66 holding the coil for rotation about hanger 66. A lower portion of the plunger assembly 62 includes a convex elastomeric anvil surface 68 flanked by rollers 70. The rollers 70 guide the carrier strip 14 downward across the lower surface of the anvil 68 which contacts the inner surface 18 of the carrier strip and up between pinch rollers 72 which grasp the portion of the carrier strip 14 after dots have been removed.

Referring now to FIG. 7, the handle 64 may be grasped and pressed downward toward the carrier sheet 63 as indicated by arrow 74. The pinch rollers 72 are mounted to be fixed in height with respect to the foot portion 60 and to rotate only in a manner that would pull tape from the coil 30. Hence, with downward motion of the plunger assembly 62, the anvil 68 moves towards the carrier sheet 63 simultaneously causing the unwinding of carrier strip 14 from the coil 30 such that at the moment the anvil 68 strikes the carrier sheet 63 a glue dot 22' is positioned immediately beneath the anvil 68 to be attached to the carrier sheet 63.

Referring now to FIG. 8, the handle 64 may be pulled upward aided by the springs (not shown) between the foot portions 60 and the plunger assembly 62, at which time a ratchet lever (not shown) interconnecting the plunger assembly 62 and the foot portion 60 causes a partial rotation of the pinch rollers 72 in response to the movement of the plunger assembly 62 with respect to the foot portion 60. This rotation of the pinch rollers 72 advances the carrier strip 14 to remove slack and cause it to remain abutted to the anvil 68 in preparation for a new actuation sequence.

Thus the tape of the present invention provides a simple method for dispensing dots of glue for joining materials together without the need for complex equipment or exposure to heated thermoplastic materials.

Figure 9:
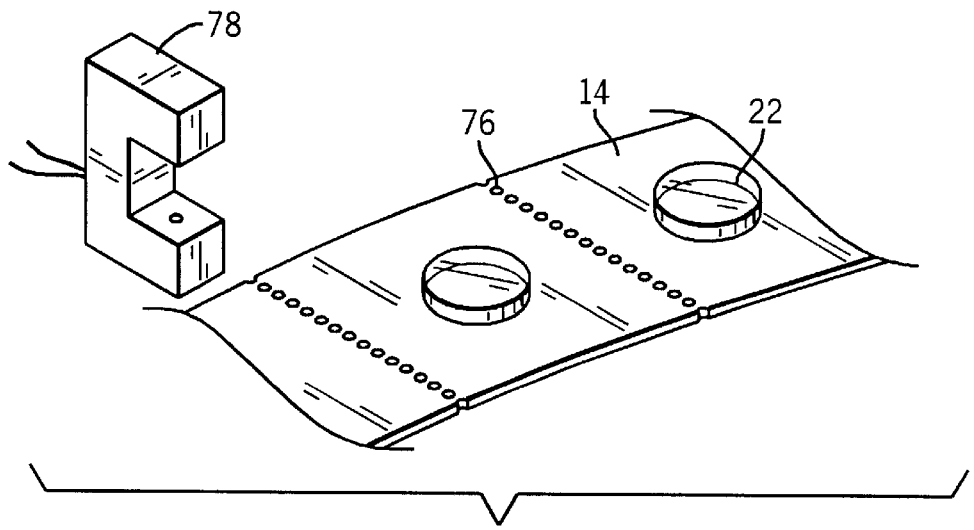
FIG. 9 is a perspective view of a section of a strip of the present invention showing the placement of perforations in the release liner so that portions of the strip may be easily separated by tearing.

Referring now to FIGS. 1 and 9, a transverse line of perforations 76 may be cut in the carrier strip 14 between dots 22 to allow individual dots supported by carrier strip 14 to be torn off for use. The perforations 76 may be precut in the carrier strip 14 prior to dispensing of the thermoplastic adhesive on its surface. In this case, an optical sensor 78 or the like may be used to coordinate operation of the dispensing nozzle so that dots 22 are correctly placed between the perforations 76. Alternatively, the perforations 76 may be cut with a conventional punch and die mechanism (not shown) positioned along the carrier strip 14 before or after the nozzle 20 and coordinated with operation of the nozzle 20.

Figure 10:
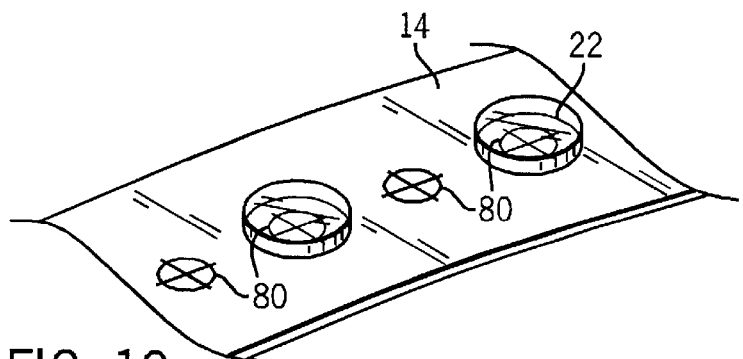
FIG. 10 is a figure similar to that of FIG. 9 showing the printing of registration marks on the release liner to assist in the use of the strips of the present invention in automated equipment in the printing industries.

Referring to FIGS. 1 and 10, alternatively or in addition to the perforations 76, printer registration marks 80, such as may be detected by automatic printing and dispensing equipment, may be placed in regular positions only the upper or lower surface of the carrier strip 14 in regular spatial relationship to the dots. Preferably for clear dots 22, the location will be under the dot 22 or midway between adjacent dots 22, although other locations are also acceptable. These registration marks 80 allow ready location of the dots 22 by human operators or machines, particularly when the dots 22 are clear.

Thermoplastic adhesive may be formulated for varying degrees of tack or other properties and the thermoplastic adhesives of different types may be compounded with colors to allow them to be readily distinguished on the carrier strip 14. The pigments may be also added for aesthetic reasons and may include colors as well as glitters and the like for craft purposes. Temperature sensitive inks may be added to the thermoplastic to provide compact temperature indicators.

In a similar manner, fragrances may be compounded with the thermoplastic adhesive. Such dots 22 thus serve as a convenient way of attaching and metering fragrances for example as samples. Pharmaceutical materials may be included into the thermoplastic in the manner of current drug patches, and other blendable ingredients such as magnetic materials to provide for a combination of adhesive and magnetic materials. Thus, generally, the dots 22 may provide metering, packaging and affixing properties in one product.

During manufacture, the dots 22 may be attached to other articles prior to being rolled into the reels 28 including decorative items such as "wiggle eyes" or utilitarian items such as shoplifting tags or other identification materials such as micro-taggants.

Figure 11:
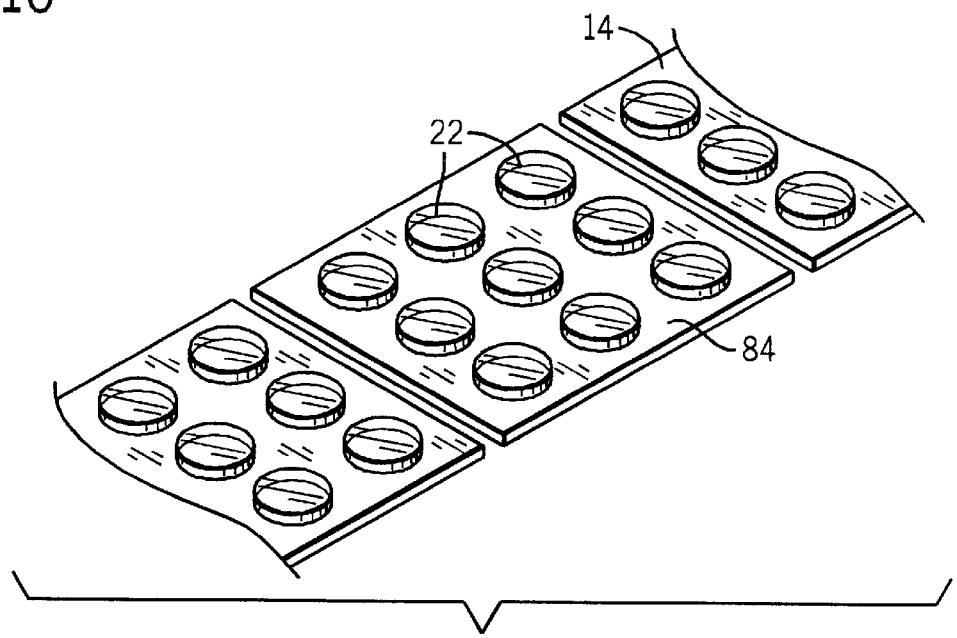
FIG. 11 is a perspective view of an alternative embodiment of the invention showing a method of producing cards holding multiple dots.

Referring now to FIG. 11, multiple nozzles 20 (not shown) may be arrayed transversely across the carrier strip 14 so as to array dots 22 at the interstices of a rectangular grid. The carrier strip 14 may then be cut transversely at regular intervals to provide the dots in the form of cards 84 suitable for small volume use and distribution.

Figure 12A:
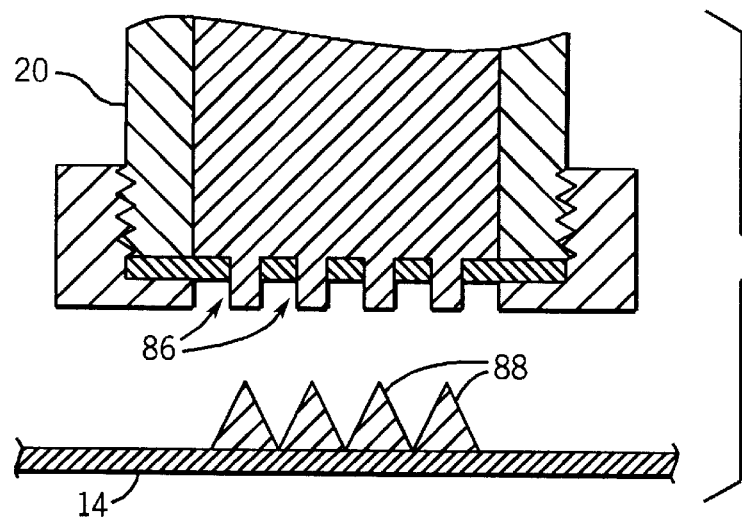
FIG. 12a is a fragmentary cross sectional view of a thermoplastic glue dispensing nozzle adapted for the production of dots of different shapes.
Figure 12B:
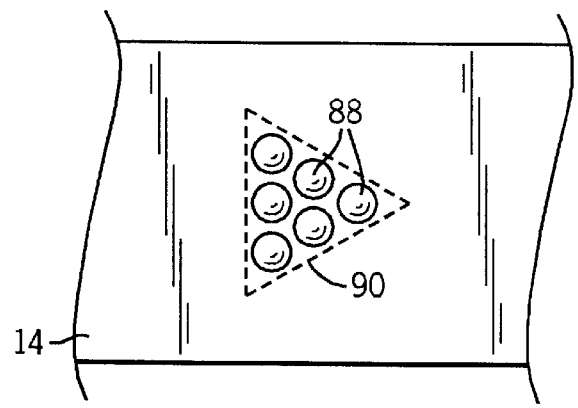
Figure 12C:
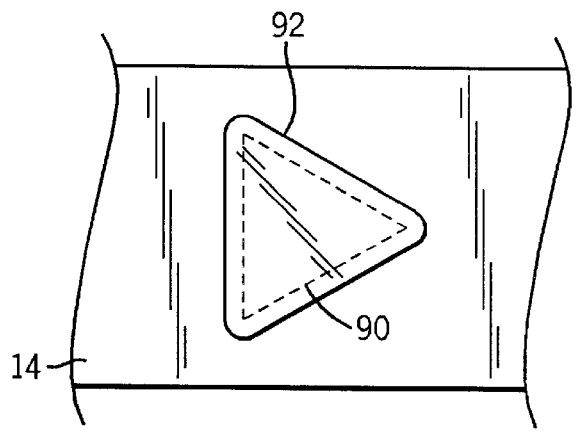
FIG. 12c is a plan view of the strip of FIG. 12b after fusing of the adjacent dots by pressure of a next layer of release liner.

Referring to FIGS. 12a–12c, dot shapes other than disks may be formed by the use of a nozzle 20 having multiple orifices 86 to deposit on the carrier strip 14 adjacent "dotlets" 88 arranged generally in a perimeter 90, the latter conforming to the ultimate shape desired of the dots 22. After compression, the dotlets merge to a pad 92 conforming substantially to the desired shape. In this manner, arbitrary shapes including those with apertures may be formed including but not limited to circles, triangles, squares stars and crescents, to name a few. The smaller the dotlets 88, the higher the resolution of the shape. Screen printing processes, in which the orifices 86 may be provided by a printing screen may thus be used.

The above description has been that of a preferred embodiment of the present invention. It will occur to those that practice the art that many modifications may be made without departing from the spirit and scope of the invention. For example, a separate release strip may be wound into the coils of the dots to avoid the need for a carrier strip having opposed release surfaces. In order to apprise the public of the various embodiments that may fall within the scope of the invention, the following claims are made.

I claim:

1. A method of manufacturing thermoplastic adhesive dispensing tape comprising the steps of:

(a) unrolling a flexible carrier strip from a first reel to expose a first release surface, said flexible carrier strip extending longitudinally, having a transverse width, and having a second release surface opposite the first release surface;

(b) dispensing molten thermoplastic adhesive at periodic intervals on the unrolled flexible carrier strip to provide at least two separate portions of thermoplastic adhesive at transversely separated locations;

(c) providing an indicator to separate the flexible carrier strip into multiple segments having at least one portion of thermoplastic adhesive; and (d) compressing the upper surface of the flexible carrier strip against a non-stick surface to compress the dispensed molten thermoplastic adhesive into flat pads.

2. The method of manufacturing of claim 1 wherein the non-stick surface is the second release surface of the carrier strip brought into contact with the upper surface when the carrier strip is coiled.

3. The method of manufacturing of claim 1 wherein the non-stick surface is a drum rolling across the upper surface of the carrier strip.

4. The method of claim 1 wherein the step (d) of compressing is delayed until the thermoplastic adhesive has skinned over.

5. The method of claim 1 wherein the indicator of step (c) is formed by longitudinally slitting the flexible carrier strip between the separate portions of thermoplastic adhesive.

6. The method of claim 1 wherein the indicator of step (c) is formed by transversely cutting the flexible carrier strip at periodic location to produce cards containing at least one thermoplastic adhesive portion.

7. The method of claim 1 wherein the step (b) of dispensing molten thermoplastic adhesive, simultaneously dispenses a plurality of multiple adjacent portions of thermoplastic adhesive arrayed within a perimeter of predetermined shape and wherein the step (d) of compressing the upper surface of the flexible carrier strip against a non-stick surface joins the multiple adjacent portions into flat pads conforming substantially to the perimeter.

8. The method of claim 7 wherein the perimeter is selected from the group consisting of: circles, rectangles, squares, triangles, stars and crescents.

9. The method of claim 1 including the step of compounding the thermoplastic adhesive with at least one of the group consisting of: fragrances, pigments, magnetic material, and pharmacological material.

10. The method of claim 1 wherein the indicator of step (c) is formed by printing registration marks on the first release surface.

11. The method of claim 1 wherein the indicator of step (c) is formed by cutting transverse lines of perforations across the flexible carrier strip.

12. The method of claim 11 including the step of attaching an article to the dispensed thermoplastic adhesive prior to step of cutting transverse lines of perforations across the release liner.

\* \* \* \* \*